United States Patent Office 3,375,717
Patented Apr. 2, 1968

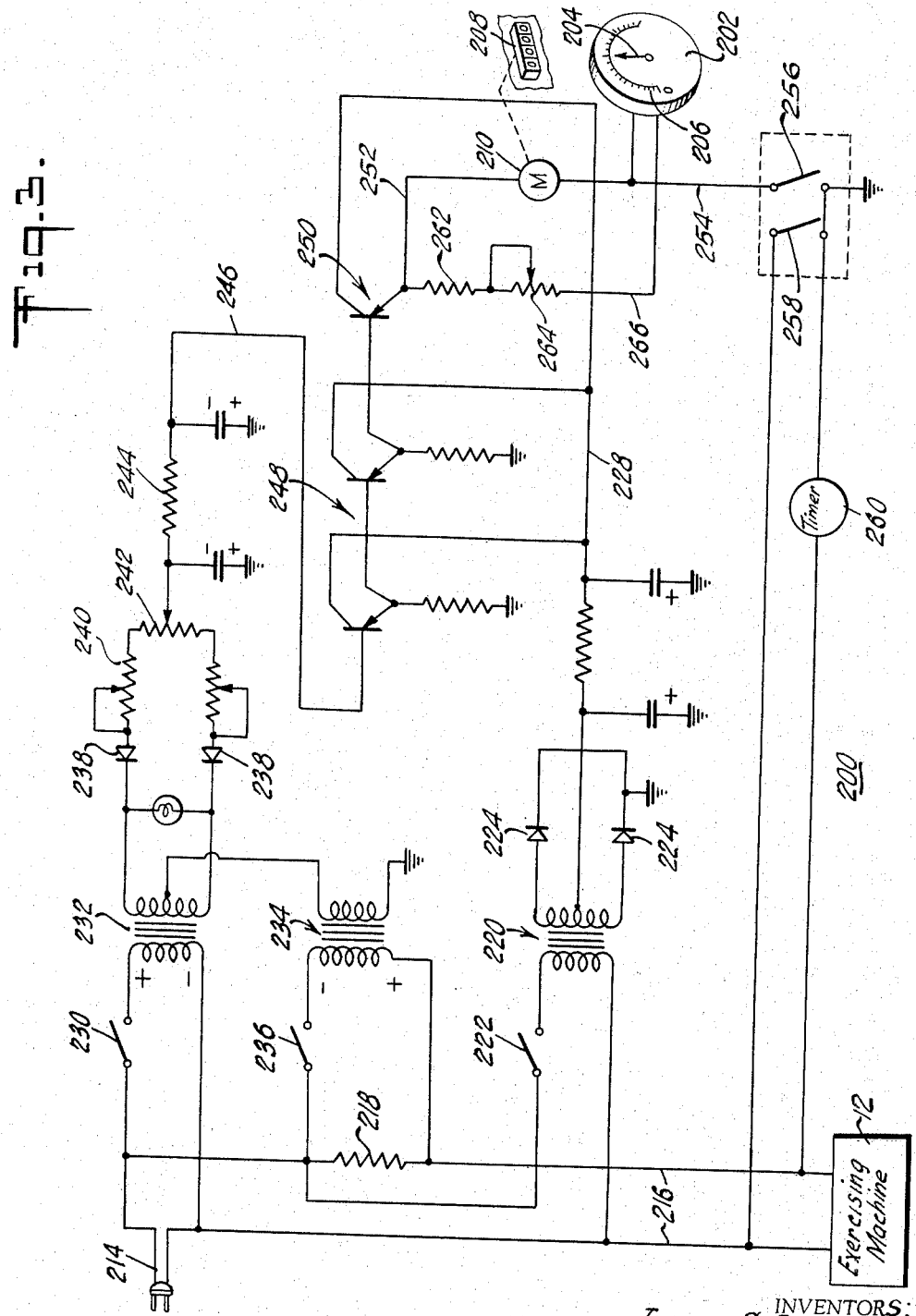

3,375,717
EXERCISING MEASURING SYSTEM
Julius S. Impellizzeri and Steven Hahn, New York, and Paul D. Burian, Elmsford, N.Y., assignors to Exercycle Corporation, New York, N.Y.
Filed June 29, 1965, Ser. No. 467,953
4 Claims. (Cl. 73—379)

ABSTRACT OF THE DISCLOSURE

An exercise measuring system particularly adapted for use with an "Exercycle" brand motor-driven machine. The system measures the no-load power applied to the motor of the machine, and obtains a zero signal level at no-load which increases as the person on the machine more and more aids its motions. Instantaneous exercising level is displayed on one meter and long term exercising effort is totaled on a second meter. The person by observing these meters as he exercises is enabled to better coordinate his motions and more smoothly follow the complex motions of the machine.

---

Figure 1:
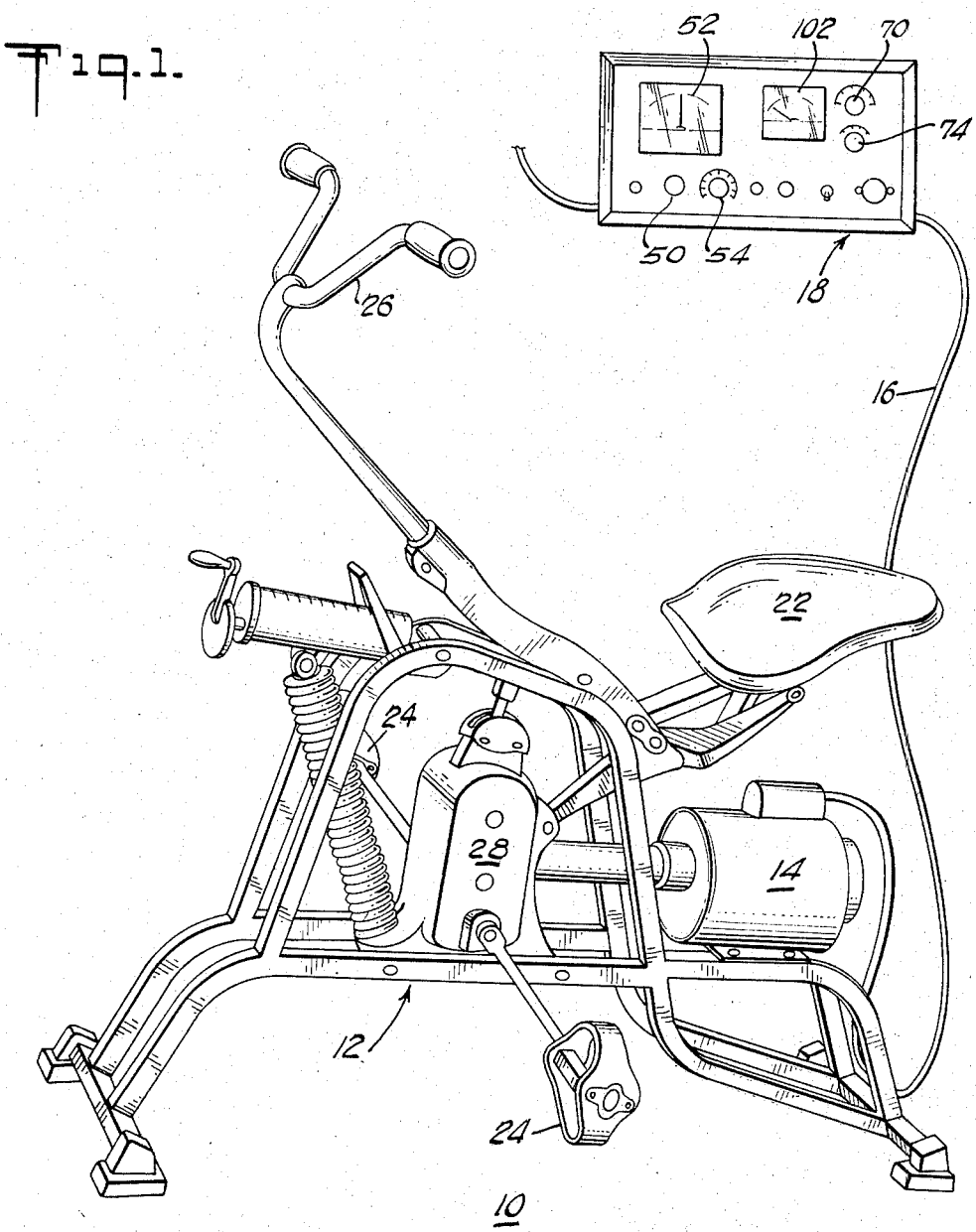

This invention relates to a system for measuring the energy expended by a person in using an exercising machine. More particularly, it relates to an electrical measuring system for use in connection with a motor-operated exercising machine such as that sold under the registered trademark "Exercycle."

An object of this invention is to provide an accurate reading of the energy expended by a person in exercising on a motor-driven exercising machine.

A further object is to provide a very accurate yet simple and inexpensive arrangement of this kind for use in connection with a specialized motor-driven exercising machine such as sold under the trade name "Exercycle."

Still another object is to provide an arrangement of this kind which indicates both the instantaneous energy being expended by the person exercising, as well as a reading of the total energy he has expended within a measured time.

These and other objects will in part be pointed out in, and in part understood from, the following description.

An "Exercycle" brand exercising machine is designed to be ridden somewhat like a bicycle. It has in addition to a seat, pedals, and handlebars which are driven by a motor in precisely-timed orbits which enable a person riding the machine and aiding its motions to exercise his shoulders, arms, legs, thighs, abdomen, and back. The present invention provides a highly accurate and effective way of measuring the amount of energy a person is expending instantaneously in riding such an exercising machine. The invention also provides a continuous reading of the total amount of energy that the person has expended on the machine in a given amount of time.

This invention is unique in that it provides a system for obtaining accurate measurements with a machine which is motor-driven, rather than a machine which is driven solely by the person himself or which uses an auxiliary generator or mechanical energy absorbing device. In a machine to which the present arrangement is particularly adapted, it is impossible without sacrificing the superior advantages of the machine to do away with the motor and drive gearing or to use auxiliary energy absorbing systems. The present invention is able to provide accurate measurements of energy, both instantaneously and long-term, without affecting the mechanical operation of the machine. In fact, a measuring system in accordance with the invention can be interconnected to an "Exercycle" exercising machine by means of the electrical power line which supplies current to the drive motor; thus this measuring system can be sold separately from the machine and, conversely, the machine can be designed for most effective exercising action without any limitations imposed by the energy measuring system.

An important advantage of the invention is that it enables an operator of an "Exercycle" machine more accurately and easily to coordinate his exercising motions. The "Exercycle" machine provides a unique and specially balanced pattern of movements which when properly followed by the operator give him effective yet not overstrenuous exercise. Because the invention is able to indicate instantaneously whether the operator is working with the machine as desired, or instead knowingly or unknowingly "bucking" it, the operator is enabled to follow the motions of the machine more smoothly. Thus even novices in riding the machine can even more quickly ride it in the most effective way.

In accordance with the invention, in one specific embodiment thereof, a unique measuring circuit is connected to the motor of an "Exercycle" machine. This circuit responds to the product of $EI \cos \theta$, where $I$ is the current drawn by the machine's motor at any level, $E$ is the input voltage, and $\theta$ is the phase angle between current and voltage. The circuit gives a meter reading of zero at idling or a reading of maximum when the operator of the machine is putting it under full exercising load. The circuit and meter are able to respond to rapid variations and peaks in the exercising load so that sudden bursts of exercising energy by the operator will be immediately indicated to him. The circuit also provides an integrated or long-term measure of the total energy expended in riding the machine during an exercising period. Thus at the end of the time, the operator will have an accurate measure of the total amount of "riding" put in, and during the actual "riding" he can gage within precise limits how little or much he is working. The invention therefore provides an accurate quantitative measure of both the rate and the total amount a person exercises during a given period.

Figure 2:
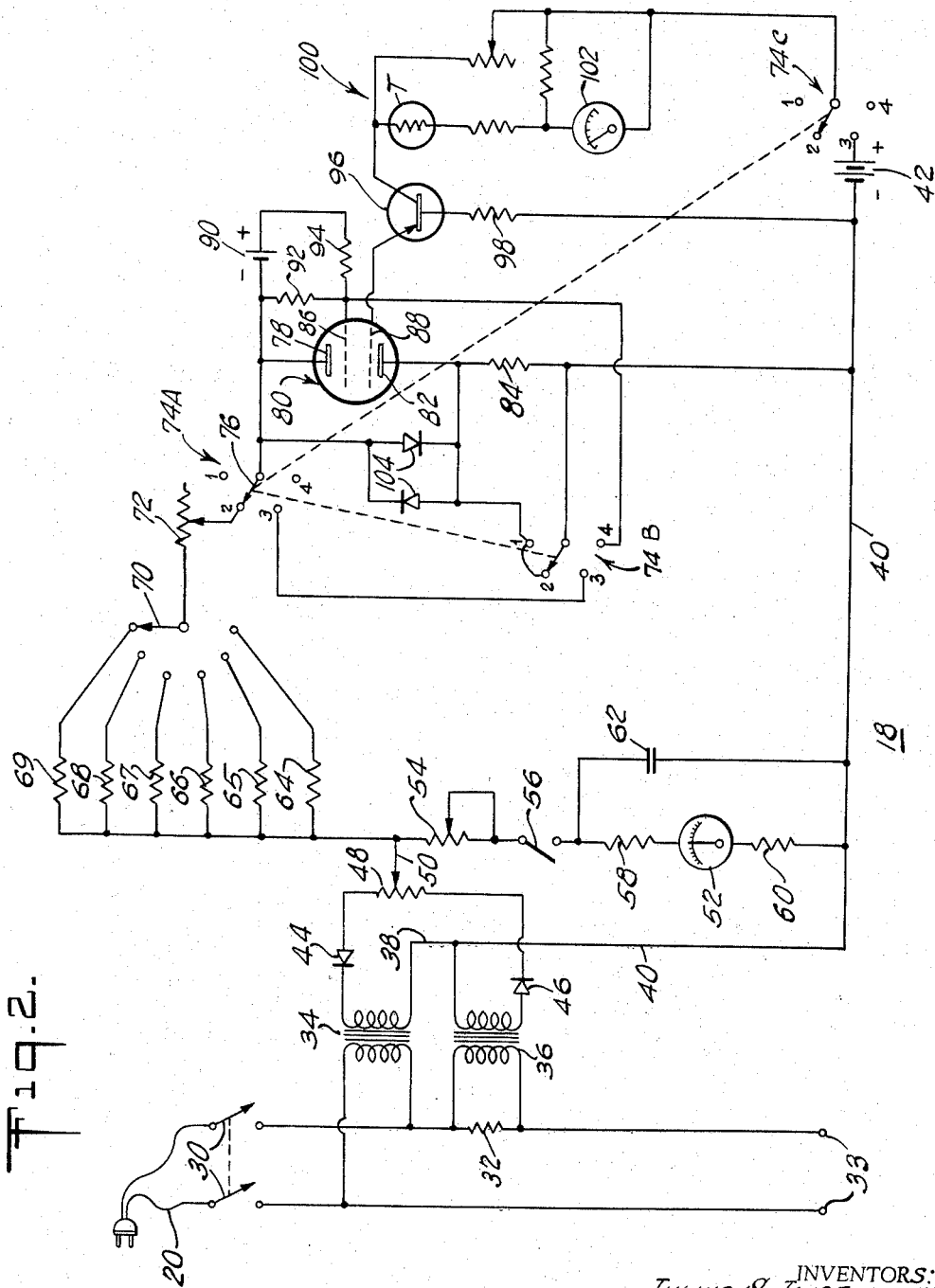

A better understanding of the invention, together with a fuller appreciation of its many advantages, will best be gained from the following description given in connection with the accompanying drawings wherein:

FIGURE 1 is a perspective view of an "Exercycle" brand exercising machine interconnected with an energy measuring system according to the invention, FIGURE 2 is a schematic diagram of one embodiment of an electric circuit of a measuring system embodying the invention, and FIGURE 3 is a schematic diagram of another circuit embodying the invention.

The arrangement 10 shown in FIGURE 1 comprises an exercising machine generally indicated at 12, having a drive motor 14 which in turn is connected via a power cord 16 to an exercise measuring module generally indicated at 18. The latter, which will be described in detail in connection with FIGURE 2, contains an electric circuit and has on its front panel a number of control knobs and indicating meters for use by the person riding machine 12. Module 18 is connected to a standard power line by a cord 20.

Machine 12, which stands on the floor, is intended to be ridden somewhat like a bicycle, and to this end has a seat 22, a pair of pedals 24, and handlebars 26. Motor 14 drives the pedals, handlebars, and seat through a worm gear assembly 28 in a complex motion which enables the operator to flex his leg, arm, and back muscles in a highly effective manner. By aiding to a greater or less extent the movements of the machine the person on it can exercise to a greater or less degree. However, the amount he does exercise is, as will be explained in detail below, accurately measured by module 18.

FIGURE 2 shows the schematic circuit for module 18. Power is applied to the circuit at the upper left via line cord 20. This cord is connected through a main switch 30, and a low ohmage, current sensing shunt 32 in series with one side of the line, to a receptacle 33 into which the power cord 16 of machine 12 can be plugged. Connected across the two sides of line cord 20 is the primary of a first transformer 34, and connected across the shunt 32 is the primary of a second transformer 36. One side of the secondary of each of these transformers is connected to the other at junction 38 which in turn is connected via a common lead 40 to the negative of a bias battery 42.

The other sides of the secondaries of transformers 34 and 36 are connected via rectifiers 44 and 46 to a nulling potentiometer 48 having a center tap 50. Now, to sense the voltage between tap 50 and junction 38, there is an indicating meter 52 which is connected in circuit via a sensitivity adjusting resistor 54, an on-off switch 56, and resistors 58 and 60. Meter 52 is shunted by a damping capacitor 62 which controls its rate of response to variations in the voltage between tap 50 and junction 38.

With exercising machine 12 in operation, but with the person riding it coasting along and neither aiding nor opposing the machine, nulling potentiometer 48 is adjusted until meter 52 reads zero. Then when the person begins to exercise, the needle of meter 52 will indicate just how much he is exercising. By exercising so as to keep the indicating needle of the meter steady at a point on the meter scale, a person will have better coordinated his efforts. A fluctuating needle indicates lack of coordination, or else intentional bursts of exercising effort.

The remaining portions of FIGURE 2 are circuitry relating to the long-term measuring of exercising effort. Briefly, the elements by which this measure is derived include a "Solion" brand cell, whose resistance is a function of the coulombs of electric charge passed through it, an amplifying transistor and an output meter having a calibrated scale and a moveable needle. These elements are connected in circuit across potentiometer tap 50 and common lead 40 as follows. Connected to tap 50 are six range-setting resistors 64, 65, 66, 67, 68 and 69 which can be selectively switched in circuit by a switch 70. The other side of this switch is connected via an adjusting resistor 72 to one pole (i.e., pole 2) of deck A of a three-section switch 74. The latter has wipers 76 ganged as indicated by the dotted lines, and comprises decks A, B and C. In the switch positions shown here, the circuit is connected to indicate the time integral of instantaneous exercising effort. The wiper of section A is connected to an electrode 78 of a "Solion" cell generally indicated at 80. An opposite electrode 82 of this cell is connected via a resistor 84 to common lead 40. Thus current is applied to the cell in proportion to the voltage between tap 50 and lead 40. The current which flows into the cell changes its resistance in proportion to the time integral of the current. By measuring the resistance of the cell, the long-term exercising effort on machine 12 can be accurately determined.

Cell 80 has two additional electrodes, namely electrode 86 and electrode 88. The first of these and electrode 78 are connected to a battery 90 and voltage dividing resistors 92 and 94 as shown. Electrode 88 is connected to the emitter of an amplifying transistor 96 whose base is connected through a resistor 98 to lead 40 and the negative of battery 42. The collector and base of transistor 96 are connected through a temperature-compensating and dividing resistor network, generally indicated at 100, to an indicating meter 102 and to the positive of battery 42. Meter 102 gives a reading proportional to the integral of the current applied to cell 80. Choosing various ones of the range-setting resistors 64 through 69, changes the scale reading of meter 102. On the lowest scale, full deflection of the meter is obtained after only a few minutes of moderate exercising effort on machine 12, whereas a higher range requires a proportionally longer time and/or exercising effort.

Switch 74 is arranged so that in positon 1 of its wipers, cell 80 will hold indefinitely its integrated current reading. In switch position 2 (the one shown), the cell will integrate the current applied to it from tap 50 and cause meter 102 to give an accumulating measure of exercising effort. In switch position 3, the cell will be reset to zero so that meter 102 will read zero total effort. In switch position 4, the cell and meter 102 are turned off.

The "Solion" cell is a unit bought commercially. Its operation is known in the art. The cell is shunted by a pair of oppositely connected diodes 104 to prevent excessive voltage across the cell. Meters 52 and 102 have been indicated on the front panel of module 18 in FIGURE 1 along with switch 30, potentiometers 48 and 54, range switch 70 and function switch 74.

FIGURE 3 shows in another embodiment an electric circuit 200 for measuring both the instantaneous and long-term exercising effort exerted on machine 12.

Here a meter 202, which is shown at the right, includes a movable needle 204 which traverses a semicircular scale 206 calibrated in peak or instantaneous exercise units. With the exercising machine motor 14 on, but with the operator merely idling and expending no effort, needle 204 will read zero on scale 206. Just above the meter is a dial counter 208 which sums the total number of energy units expended by the operator in any measured period of time. Counter 208 is mechanically driven by a small D.C. motor 210 coupled to it by a shaft. Electric circuit elements which energize meter 202 in accordance with the exercising effort expanded on machine 12 are also shown in FIGURE 3. Input power to the circuit is applied at the upper left through line 214. The left side of the line is connected directly, via one wire of line 216, to the motor in machine 12. The other side of line 214 is connected, via a low ohmage, current sensing shunt 218 to the other side of line 216 and to machine 12. As will be explained below, the voltage drop across shunt 218 relative to the input voltage on line 214 is used to determine the exercising level at machine 12.

Low level, well filtered D.C. voltage to energize circuit elements is derived from line 214 by means of a transformer 220 whose primary is connected through a switch 222 to the line. The secondary of this transformer is connected to a pair of rectifiers 224, a common side of which is grounded. The center tap of the secondary is connected to a standard capacitor-resistor filter arrangement 226 the output of which is a negative voltage lead 228.

Connected directly across line 214, via a switch 230 is the primary of another transformer 232 whose secondary is center-tap connected to the secondary of yet another transformer 234 as shown. The primary of the latter transformer is connected via a switch 236 across resistor 218. Relative polarities of the primaries of transformers 232 and 234 are as indicated.

The A.C. voltage across the outer taps of the secondary of transformer 232 is applied through a pair of rectifiers 238 to a resistance network comprising a pair of adjustable resistors 240 and a potentiometer 242. The slider of the latter element is connected to the input side of a resistor-capacitor ripple filter indicated at 244. Connected to the output of this filter is a lead 246, which in operation of the system moves up or down in D.C. voltage level inversely in relation to the actual power consumed by the motor 14 of machine 12, but directly in proportion to the exercising load placed on the machine by the person riding it and aiding its motions. The voltage on lead 246 is nulled or set to a value, corresponding to the running, no-exercising load but full motor load condition of machine 12, by means of potentiometer 242.

The voltage on lead 246 is amplified to obtain high measuring sensitivity and accuracy. To this end, lead 246 is connected directly to the base of the first transistor of a three transistor D.C. amplifier indicated at 248. Power for the amplifier is obtained from lead 228. An output signal from the amplifier is obtained as current flowing between emitter-collector of the third or right-hand transistor 250. Connected directly to the emitter of transistor 250 is a lead 252 which runs to one side of the integrating D.C. motor 210. The other side of the motor is connected to a lead 254 which runs to ground via a switch 256. Ganged with this switch is another switch 258, which in turn controls a clock or timer 260. When these switches are closed to the timer runs at a fixed speed to indicate elasped time, and motor 210 runs at a variable speed, depending upon the output signal from amplifier 250. The number of revolutions of motor 210 is indicated by the wheels of counter 208 to which it is connected.

The emitter of transistor 250 is also connected, through a dropping resistor 262 and an adjustable resistor 264 to a lead 266. The latter connects to the coil in meter 202 which deflects pointer 204. The other side of the coil is grounded through lead 254.

In operation of the system, all of the switches in FIGURE 3 are closed. As the person exercising more and more aids the motor in machine 12, a greater and greater negative voltage is applied to lead 246. This is amplified as explained above, and accurately proportional control currents are applied to meter 202 and motor 210. At the end of an exercising session, the operator can read elapsed time indicated by timer 260 and total exercise units indictated by counter 208.

The above description is intended in illustration and not in limitation of the invention. Various minor changes or modifications in the embodiments set forth may occur to those skilled in the art, and these may be made without departing from the spirit or scope of the invention.

We claim:
1. In an exercising system wherein a motor-driven exercising machine having a seat, handlebars and pedals which are driven through a gear box by an electric motor in a complex set of motions and which is adapted to be ridden by a person who when more and more aiding the motions of the machine causes the motor to consume less and less power than the no-load power required to run the machine when the person is neither aiding nor opposing its motions, that improvement which comprises a quantitative arrangement for measuring the person's exercising effort including an electric meter for indicating the person's exercising level, a pair of transformers, one transformer having its primary connected to sense voltage applied to said motor and the other transformer having its primary connected to sense current applied to said motor, rectifier means connected to the secondaries of said transformers to provide a D.C. signal inversely proportional to the power drawn by said motor, and adjustable nulling means connected to said rectifier means and to said meter to apply to said meter a signal corresponding to zero exercising level on said meter when the machine is being ridden but is neither aided nor opposed and to provide an increasing signal when the person more and more aids the machine, whereby the person by observing the meter reading as he exercises is better able to coordinate his exercising motions, and to follow the motions of the machine more smoothly.

2. The arrangement in claim 1 in further combination with totalizing means connected to said nulling means, said totalizing means indicating a total number of exercise units expended by a person in aiding the machine in a given period.

3. In an exercising system wherein a motor-driven exercising machine having a seat, handlebars and pedals which are driven through a gear box by an electric motor in a complex set of motions and which is adapted to be ridden by a person who when more and more aiding the motions of the machine causes the motor to consume less and less power than the no-load power required to run the machine when the person is neither aiding nor opposing its motion, that improvement which comprises a quantitative arrangement for measuring the person's exercising effort including electric meter means for indicating a person's exercising effort, first means responsive to the power voltage applied to said motor, second means responsive to the power current drawn by said motor, and nulling means connected to said first and second means to develop a D.C. signal from zero to a maximum value proportional to the person's exercising level when aiding the machine, said meter being connected to said nulling means, said nulling means being adjustable to provide a zero reading on said meter means when the person is neither aiding nor opposing the machine, whereby the person by observing said meter means is better able to coordinate his exercising motions and to follow the motions of the machine more smoothly.

4. The arrangement in claim 3 wherein said meter means comprises a first meter giving readings of instantaneous level when the person is exercising, and a second meter which integrates the long term exercising level during an exercising period.

References Cited
UNITED STATES PATENTS

| | | | |
|---|---|---|---|
| 2,282,396 | 5/1942 | Cravath | 324—142 X |
| 2,595,373 | 5/1952 | Stewart | 324—142 X |
| 2,758,830 | 8/1956 | Bentley | 324—192 |
| 2,784,591 | 3/1957 | Shoor | 73—379 |
| 2,854,631 | 9/1958 | Annich et al. | 324—83 |

RICHARD C. QUEISSER, *Primary Examiner.*
JAMES J. GILL, *Examiner.*
J. H. WILLIAMSON, *Assistant Examiner.*